April 8, 1952 M. J. LEWIS 2,592,299
ELECTRIC INSTRUMENT SOCKET
Filed Aug. 5, 1949 4 Sheets-Sheet 1

INVENTOR
Morgan J Lewis
BY
ATTORNEYS

April 8, 1952 M. J. LEWIS 2,592,299
ELECTRIC INSTRUMENT SOCKET
Filed Aug. 5, 1949 4 Sheets-Sheet 2
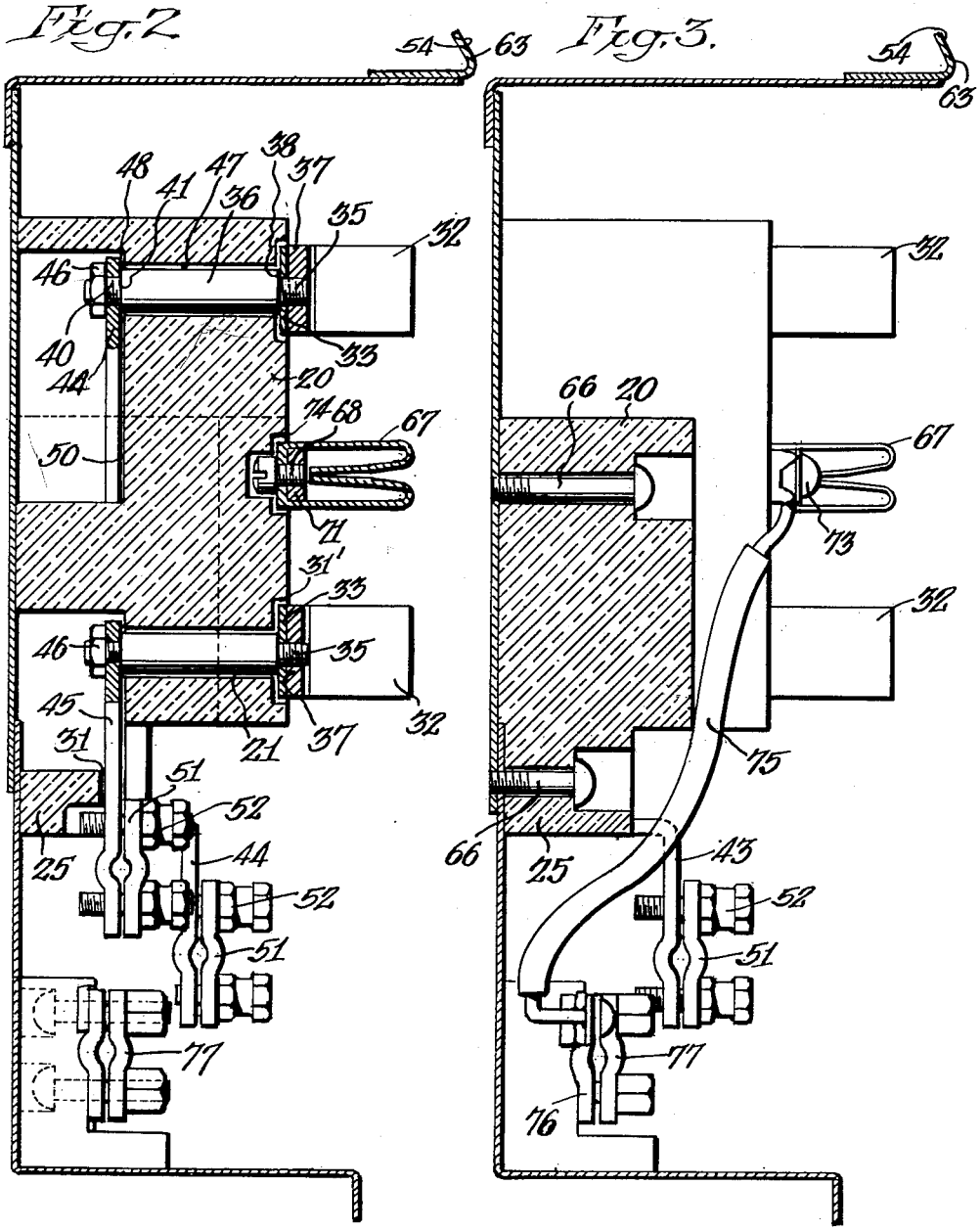
INVENTOR
Morgan J. Lewis
BY
ATTORNEYS April 8, 1952 M. J. LEWIS 2,592,299
ELECTRIC INSTRUMENT SOCKET
Filed Aug. 5, 1949 4 Sheets-Sheet 3
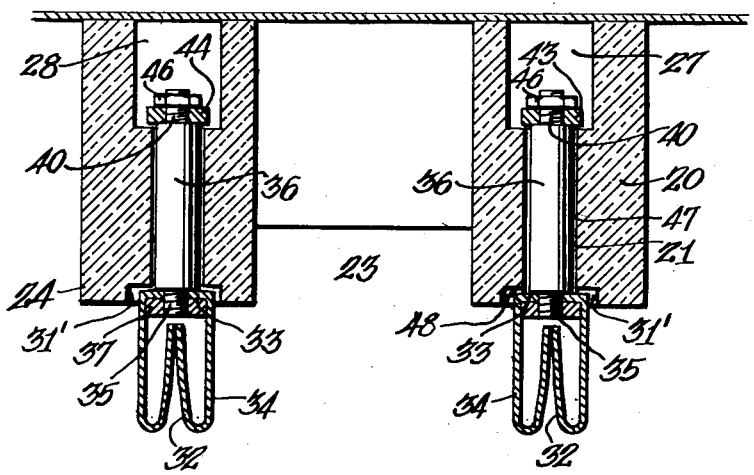
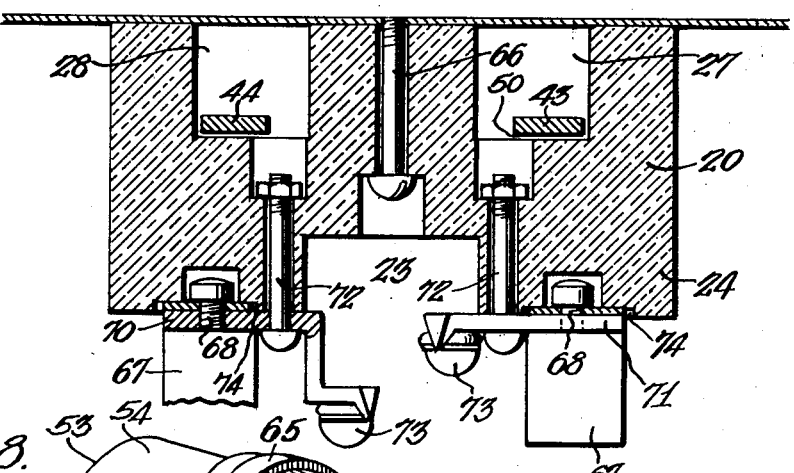
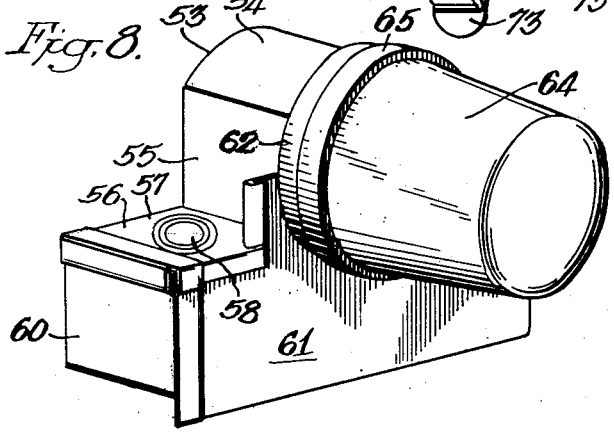
INVENTOR
Morgan J Lewis
BY
ATTORNEYS April 8, 1952 M. J. LEWIS 2,592,299
ELECTRIC INSTRUMENT SOCKET
Filed Aug. 5, 1949 4 Sheets-Sheet 4
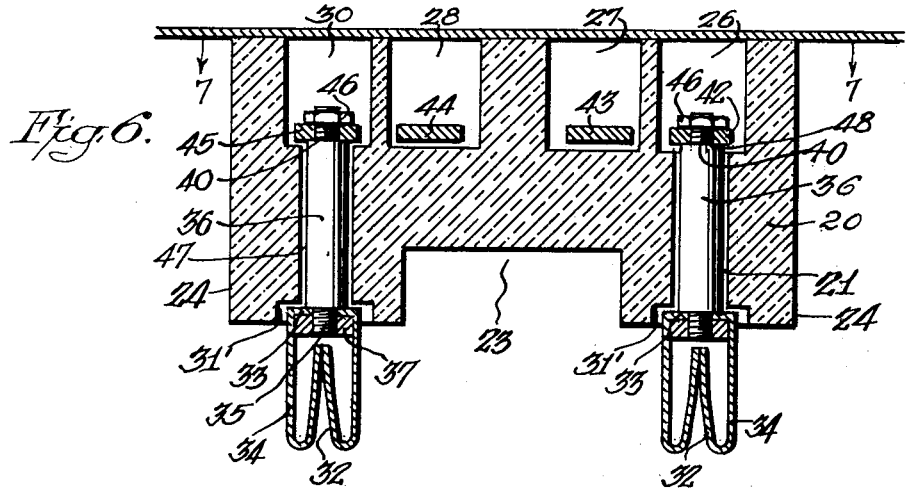
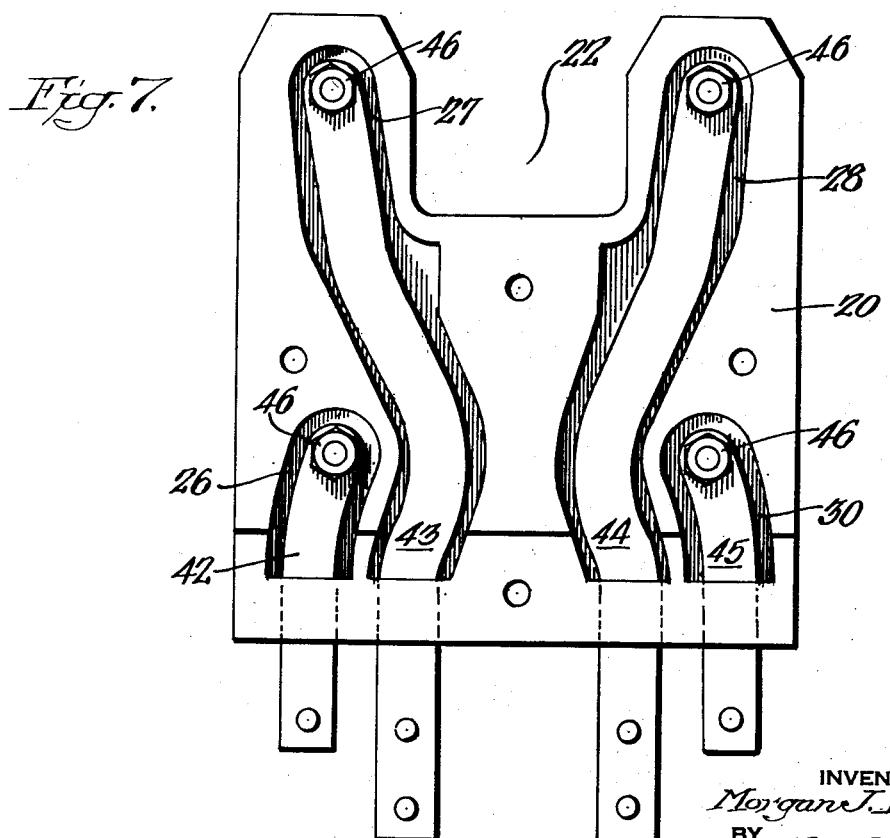
INVENTOR
Morgan J. Lewis
BY
ATTORNEYS Patented Apr. 8, 1952

2,592,299

UNITED STATES PATENT OFFICE 2,592,299

ELECTRIC INSTRUMENT SOCKET

Morgan J. Lewis, Philadelphia, Pa.

Application August 5, 1949, Serial No. 108,682

1 Claim. (Cl. 173—328)

The present invention relates to meter sockets of the character which are employed for mounting watthour meters and other instruments.

A purpose of the invention is to prevent distortion and deformation of jaw contacts on meter sockets due to misalignment of the knife blades on the meter.

A further purpose is to provide for yielding by the jaw contacts of a meter socket both laterally of the base and toward and away from the base, both to protect against damage by misalignment or inserting and removing the meter, and also to provide a shock absorbing action to take up impact applied to the meter.

A further purpose is to secure more adequate contact between a meter and a meter socket notwithstanding variations in the locations of the contacting parts.

A further purpose is to obtain resilience in the mounting of jaw contacts of a meter socket without the necessity of using highly resilient material.

A further purpose is to provide auxiliary jaw contacts on a meter socket to permit electrical connections to other equipment without departing substantially from the standard placement of the main contacts.

Further purposes appear in the specification and in the claim.

In the drawings I have chosen to illustrate one only of the numerous embodiments in which my invention may appear, selecting the form shown from the standpoints of convenience in illustration, satisfactory operation and clear demonstration of the principles involved.

Figure 2 is a section of Figure 1 on the line 2—2.

Figure 3 is a section of Figure 1 on the line 3—3.

Figure 4 is a section of Figure 1 on the line 4—4.

Figure 5 is a section of Figure 1 on the line 5—5.

Figure 6 is a section of Figure 1 on the line 6—6.

Figure 7 is a detail rear elevation of the insulating base and terminal strips, corresponding in position to a section of Figure 6 on the line 7—7.

Figure 8 is a reduced perspective showing one form of the complete socket and meter box, with a meter attached, prior to application of the locking collar.

Figure 1:
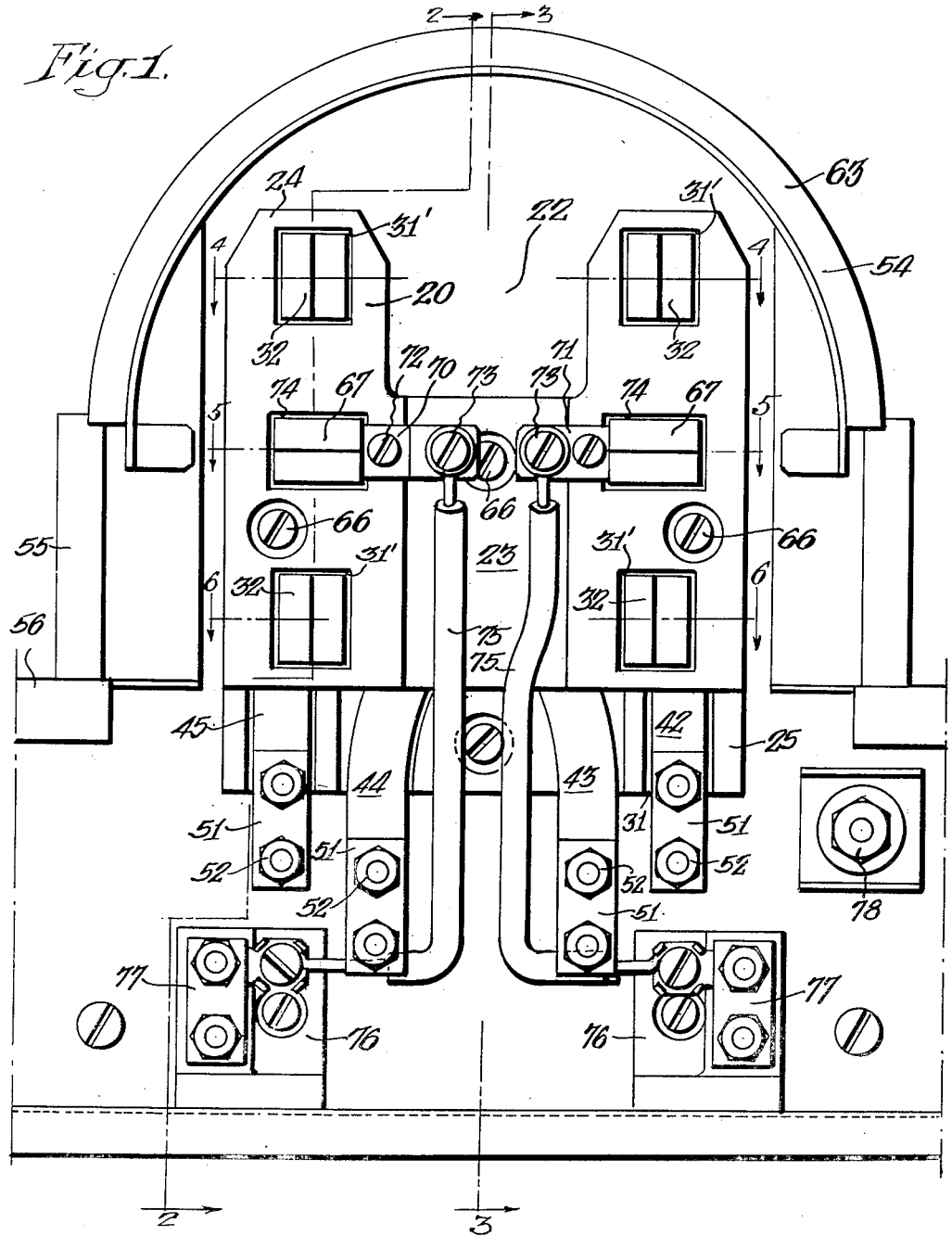
Figure 1 is a fragmentary front elevation of a meter socket embodying the invention.

Describing in illustration but not in limitation and referring to the drawings:

The present application relates to an improvement in the socket of a meter box of the character described and claimed in my copending application Ser. No. 91,686, filed May 6, 1949, for Meter and Meter Socket, now Patent 2,548,540, issued April 10, 1951.

The features relating to variations in the form of the box are shown in my copending application Ser. No. 108,681 filed August 5, 1949, now Patent 2,582,638, issued January 15, 1952, for Meter Troughs and Boxes.

In the prior art the conventional meter socket has had jaw contacts placed at positions corresponding to the corner of a rectangle. The jaw contacts, while resilient, have normally been rigidly mounted. In installing the meter or removing the same, and also in installing equipment to test the meter, the switch knives of the meter or other equipment must be withdrawn or inserted into the jaw contacts. If there is slight misalignment of the meter or other instrument axially or rotationally, or if a considerable direct pull or push is applied to the meter, a great tendency exists to distort or deform the jaw contacts, resulting in many cases in relaxing their gripping pressure so that poor contact is obtained, or in breaking the base of the socket.

By the present invention a very simple, inexpensive and nevertheless effective resilient mounting is provided for the jaw contacts so that they can readjust individually or as a group to allow for misalignment in any direction or to dissipate the energy of shocks applied. While this feature is most important during insertion and withdrawal of the meter or other instrument, it is also useful when a shock load is applied to the meter.

In many meter installations it is desirable to have one or more additional contacts. For example, where metering is to be provided for sale of current at a lower rate for off-peak power, it is often desirable to operate a clock in the meter. Likewise, for polyphase installations additional contacts are needed. I find that the practice of improvising external wiring for these special purposes can be avoided and that auxiliary contacts can be built into the meter socket by placing contacts between each of two pairs of main contacts. This greatly facilitates the use of special installations of the character noted.

The meter socket of the invention comprises an insulating base 20, suitably of electrical porcelain or phenolic plastic, having openings 21 extending clear through and suitably located at positions corresponding with the corners of a rectangle, for example a square, as shown. The base is desirably of H formation having a recess 22 clear to the back at the top and a recess 23 extending part way from the front to the back lower down. Pillar-like portions 24 are located at each side and near the bottom there is a terminal mounting shelf 25.

At the back opposite each opening one of the terminal channels 26, 27, 28 and 30 is provided extending from the corresponding opening to the terminal shelf and ending in openings connecting with cooperating notches or slot 31 in the terminal shelf to mount the terminal strips as later described. The terminal strips are free all around in the channels.

Each of the jaw contacts at the front is in line with a contact recess 31' at the front of the base which is suitably rectangular to prevent excessive rotation of the contacts as later explained.

Each of the main jaw contacts 32 is of U-formation and has a base 33 and upstanding reverse bent prongs 34 as well known.

The base of each contact is recessed and passes the threaded end 35 of a metallic contact rod 36 suitably of bolt formation as shown. A nut 37 threaded on the end 35 locks the jaw contact rigidly to the contact rod. A shoulder 38 on the contact rod engages the base of the jaw contact opposite from that engaged by the nut.

Similar construction is provided at the rear of the contact rod. A reduced end 40 is there threaded, providing a shoulder 41 and the shoulder 41 positions one of the terminal strips 42, 43, 44 or 45, which are locked in place by nuts 46.

Thus it will be seeen that the jaw contact, contact rod and terminal strip are rigidly bolted together.

The diameter of the intermediate portion of the contact rod is substantially smaller than the diameter of the opening all around when the rod is in the center of the opening, providing ample clearance at 47 as shown. Likewise, the contact rod is sufficiently longer from the adjoining sides of the jaw contact and the terminal strip so that there is sustantial clearance longitudinally at 48. The amount of this clearance will vary with the particular installation, but it has been found convenient to employ a clearance of the order of $\frac{1}{16}$ to $\frac{1}{32}$" all around and at each end. Thus the jaw contacts are in effect floating and are free to move toward and away from the insulating base and also laterally in every direction. They also have freedom torsionally.

To preserve the freedom of floating action, the terminal strips clear from the back of the base at 50 by about the same amount as the clearance mentioned above and are not restrained until they enter the notch 31 in the shelf. At this point restraint or limitation on deflection of the terminal strips laterally and toward the rear is exerted. Thus except at the outer ends of the terminal strips the whole structure is in a floating relationship.

The terminal strips are provided at their outer ends with suitable clamping strips 51 and clamping screws 52 for connection to the line and the load as the case may be.

In operation it will be evident that whenever the meter is inserted or withdrawn from the socket or whenever shock is applied to the meter, there is a freedom and resilience in the jaw contact mounting as above described which dissipates the shock and allows the jaw contacts to readjust to the most advantageous position to grip the knife blades on the meter. The terminal strips are only limited at their outer ends by notches 31 and the back of the base near the notches. The trough and box provided around the socket may vary to suit the particular requirements.

In Figure 8 I show a trough 53 having a semicircular upper portion 54, best seen in Figure 1 and provided with generally tangential sides 55 joining to a terminal box 56 having a side extension 57 provided with a knockout 58 for connection to a conduit. The box has a removable end 60 which interlocks with the other walls in any suitable manner, not important to the present invention. A removable front cover 61 likewise interlocks with the box in a suitable manner not shown, and carries attached thereto the lower half of a trough ring 62, the upper half 63 being secured to the semi-circular portion 54 of the trough. The details of the trough and box as described are claimed in my copending applications, incorporated herein by reference, and forms no part of the present application.

A meter 64 is mounted at the trough, its base ring 65 cooperating with the trough ring 62 for engagement by a locking collar not shown.

The base 20 is suitably secured to the back of the trough by screws 66 in suitable holes.

For many purposes it will be sufficient to employ a socket having four jaw contacts, but for certain special applications auxiliary jaw contacts are desirable, and these are accordingly to be considered optional features of the present invention. The auxiliary jaw contacts may be employed to operate a clock for off-peak power metering, or for polyphase circuit connection or for any other suitable purpose.

When used the auxiliary contacts 67 are mounted opposite one another on each side between the members of each pair of main jaw contacts.

In form they may be identical with the main jaw contacts and are bolted at 68 to terminal strips 70 or 71 secured by bolts 72 to the base. A terminal screw is provided at 73. The base is recessed at the front at 74 to receive the auxiliary contacts. When the auxiliary contacts are used, the relative adjustment may conveniently be accomplished in the main contacts, while the auxiliary contacts may be positioned rigidly, although the auxiliary contacts may float also if desired.

In order to provide adequate terminal clearance, one of the terminal strips 70 or 71 is desirably bent away from the base so that it will not come too near to the opposite auxiliary terminal strip.

In order to permit wiring of the box while the meter is in place, wires 75 are connected to the terminals of the auxiliary jaw contacts and these are run to terminal blocks 76 mounted in the terminal box and having connectors 77 for attachment of external wiring.

The box is provided with a ground connection 78.

Thus all of the wires are available for connection notwithstanding that the meter may be secured in place and held by the locking collar.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention what I claim as new and desire to secure by Letters Patent is:

In a meter socket, a base having a plurality of spaced openings therethrough and having terminal channels extending away from the openings, an insulating terminal shelf and terminal slots located at the outer ends of the channels, metallic contact rods extending through the openings, substantially smaller than the openings and having freedom laterally all around when the rods are centrally located, jaw contacts mounted on the respective contact rods at one end and terminal strips mounted on the respective contact rods at the other end and extending through the channels free therefrom, over the terminal shelf and engaged in the respective terminal slots, the distance from the adjacent end of each jaw contact to the adjacent end of each terminal strip being substantially more than the length of the corresponding openings, the terminal strips being spaced away from the base until they reach the terminal shelf and there being freedom of the jaw contacts toward and away from the base as well as laterally.

MORGAN J. LEWIS.

REFERENCES CITED

The following references are of record in the file of this patent:

UNITED STATES PATENTS

| Number | Name | Date |
|---|---|---|
| 1,418,171 | Raettig | May 30, 1922 |
| 2,115,429 | Rypinski | Apr. 26, 1938 |
| 2,154,411 | Road et al. | Apr. 11, 1939 |
| 2,363,345 | MacGahan | Nov. 21, 1944 |